United States Patent Office 3,534,250
Patented Oct. 13, 1970

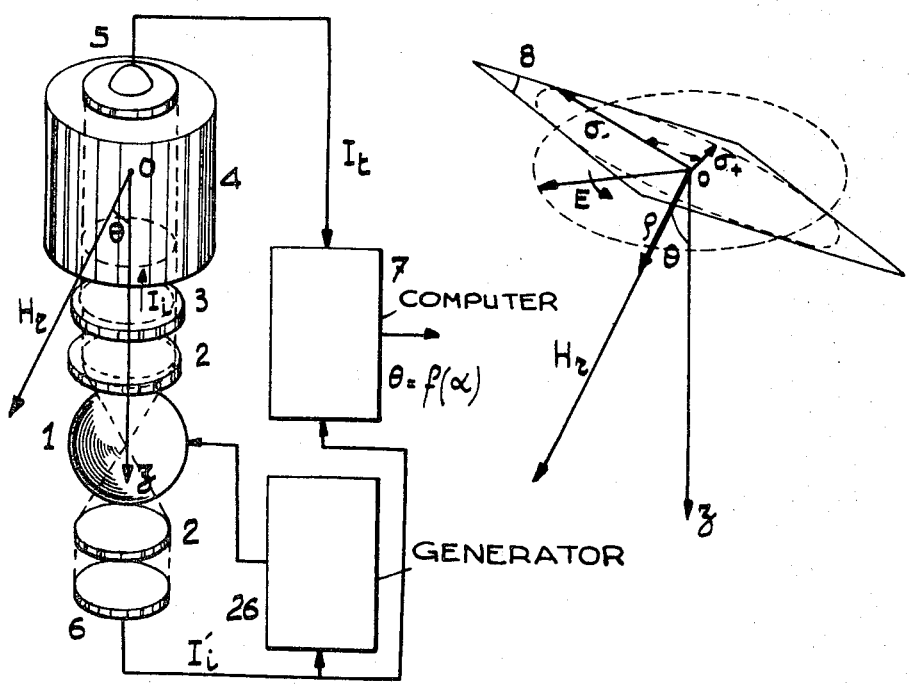
Fig. 1
Fig. 2
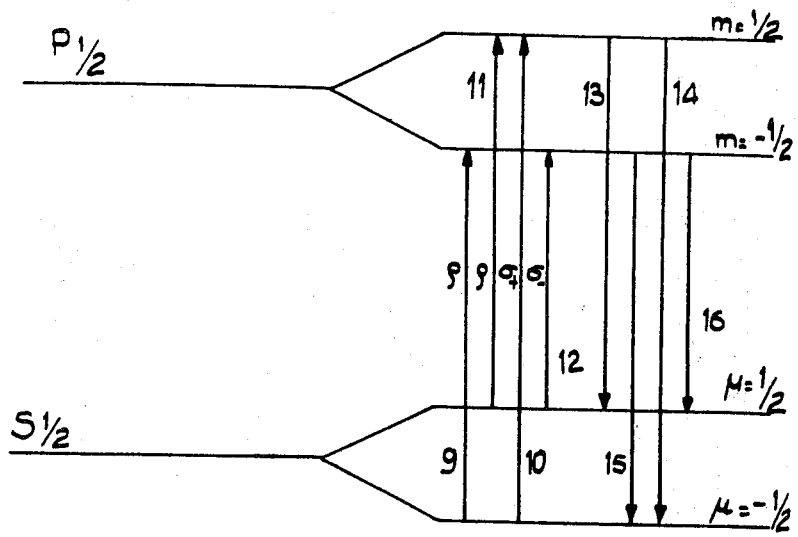
Fig. 3

3,534,250
MAGNETIC COMPASS WITH OPTICAL PUMPING
Léon Malnar, Jean-Louis Meilleroux, and Henri Brun, Paris, France, assignors to Thomson C.S.F., Paris, France, a corporation of France
Filed Jan. 11, 1967, Ser. No. 608,612
Claims priority, application France, Jan. 11, 1966, 45,533
Int. Cl. G01r 33/08
U.S. Cl. 324—.5    3 Claims

ABSTRACT OF THE DISCLOSURE

The invention relates to optical pumping devices for measuring the orientation of an external magnetic field with respect to an axis and more particularly to a magnetic compass comprising an absorption cell filled with alkali vapour. The vapour is optically pumped by means of a beam of circularly polarized light parallel to said axis. The absorbing power of said cell is a function of the direction of the ambient magnetic field with reference to said beam. Means are provided for optically sensing said absorbing power and for supplying a measure of the angle, this external field makes with a reference axis.

---

Figure 4:
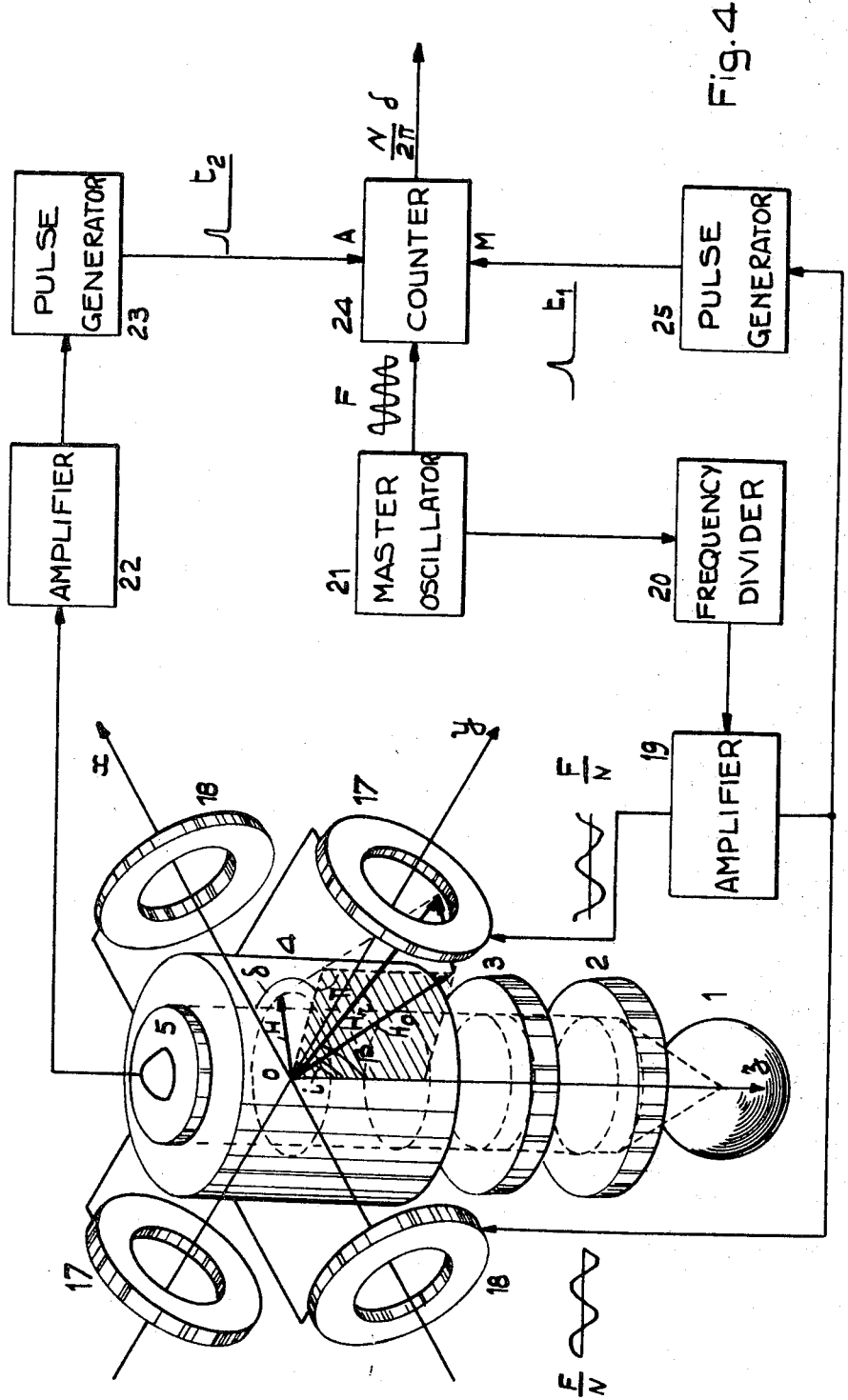

The present invention relates to alkali vapour optical pumping devices subjected to the action of a magnetic field, and more particularly to magnetometers for measuring an angle formed by this field, or by its projection on a plane, and a reference direction.

Optical pumping magnetometers of known type are based on the radiofrequency detection of a paramagnetic resonance line, characterizing an alkali vapour subjected to the action of a magnetic field. The frequency supplied by the magnetometer is a function of the intensity of the magnetic field, but does not depend on its orientation in space. A magnetic disturbance directed transversely of the existing magnetic field does not alter substantially the measured intensity, although it will affect mainly the field orientation. Such a transverse disturbance cannot be detected by a conventional optical pumping magnetometer.

In navigational applications, the knowledge of the intensity of the magnetic field is of secondary importance, since the main interest lies in the determination of a direction or course. The magnetometers originally constructed for measuring the intensity of a magnetic field can be adapted in view of their use as magnetic compass, but this adaptation entails a useless complication of the instruments.

According to the invention there is provided an optical pumping goniometer system for sensing the angle of deviation of an external magnetic field with respect to an axis, said system comprising: optical pumping means for supplying along said axis a parallel beam of circularly polarized monochromatic light; an absorption cell filled with an alkali vapour, positioned on the path of said beam and subjected to said field; photoelectric means coupled to said beam for measuring the light absorption coefficient of said cell; and computing means controlled by said photoelectric means for supplying a voltage whose amplitude is a predetermined function of said angle.

The invention will be better understood from the following description and the accompanying drawings, in which:

FIG. 1 shows a first embodiment of the magnetic compass according to the invention;
FIG. 2 is an explanatory drawing;
FIG. 3 is an explanatory graph; and
FIG. 4 shows a further embodiment of the magnetic compass according to the invention.

The magnetic compass according to the invention shown in FIG. 1, is an optical pumping device with an optical axis $o$–$z$, which is subjected to the action of a magnetic field $$\vec{H_r}$$

forming an angle $\theta$ with $o$–$z$. The device comprises a source of light 1, arranged in the focus of lenses 2 and supplied by a generator 26. The parallel light beams produced by the lenses 2 act, respectively, on the photoelectric elements 5 and 6. The first light beam arrives at the photoelectric element 5 after having passed successively through an optical device 3, comprising a rectilinear polarizer, associated with a quarter wave plate, and an absorption vessel 4, containing an alkali vapour. The photoelectric elements 5 and 6 produce electrical signals $I_i$ and $I_t$, which are proportional to the light intensities of the two beams; these signals are applied to a differential indicator 7 which indicates the angular value $\theta$ which defines the orientation of the field $$\vec{H_r}$$

relative to the optical axis $o$–$z$; the signal $I'_i$ is also applied to a control input of the generator 26 for controlling the energy fed to source 1 in such a manner as to stabilize the light output of the latter.

After passing through the device 3, the beam incident on the vessel 4 assumes the form of a circularly polarized luminous wave with an intensity $I_t$, equal within a constant factor to the regulated intensity $I'_i$ of the light beam received by element 6.

This circular wave is characterized by an electric vector $$\vec{E}$$

rotating perpendicularly to $o$–$z$ as indicated in FIG. 2. The wave vector splits into three light components $\rho$, $\sigma_+$ and $\sigma_-$, whose respective vectors are, a pulsating vector aligned along $$\vec{H_r}$$

and two vectors rotating in opposite directions in a plane 8 perpendicular to $$\vec{H_r}$$

the respective light intensities $I_3$, $I_1$ and $I_2$ of these components can be expressed as follows:
The rectilinear component $$\rho : I_3 = \frac{I_i}{2} \sin^2\theta$$

The circular component $$\sigma_+ : I_1 = \frac{I_i}{4} (1 + \cos\theta)^2$$

The circular component $$\sigma_- : I_2 = \frac{I_i}{4} (1 - \cos\theta)^2$$

The components $\rho$, $\sigma_+$ and $\sigma_-$ interact with the alkali vapour contained in the vessel 4 according to an optical pumping process, which consists in aligning more or less completely the magnetic moments of the alkali atoms of the vapour along the direction $$\vec{H_r}$$

of the magnetic field. Its absorption power varies as a function of this alignment as will be shown further below.

FIG. 3 shows by way of nonlimitative example only, the simplified graph of the energy levels of an alkali atom with a nuclear spin equal to zero and an electron spin of ½.

The pumping component $\rho$ produces optical transitions 9 and 11 which increase the atomic populations of sublevels $m=-½$ and $m=+½$ at the expense of the atomic populations of sublevels $\mu=-½$ and $\mu=+½$; the component $\sigma_+$ produces transitions 10 which increase the atomic population of sublevel $m=½$ at the expense of the atomic population of sublevel $\mu=-½$ and the component $\sigma_-$ causes transitions 12 between the sublevels $m=-½$ and $\mu=+½$. The sublevels $\mu$ do not risk being completely depopulated at the expense of the sublevels $m$, because the pumping transitions 9, 10, 11 and 12 are accompanied by reverse transitions 13, 14, 15 and 16. These latter take place spontaneously in the vapour and restitute the luminous energy which has been absorbed.

Taking into account the exchanges of atomic populations which take place in both directions and the probabilities of the transition, it may be calculated what portion of the incident light intensity $I_i$ is actually absorbed by the vapour.

This calculation shows that the value of the optical absorption power $\alpha$ of the vapour is given by the following formula, if the optical pumping is effected in accordance with the graph of FIG. 3:

$$\alpha = \frac{6.n.A.\sin^2\theta}{2+\sin^2\theta}$$

where $n$ is the atomic population of the sublevels at thermal equilibrium; and $A$ is a constant. The optical absorption power $\alpha$ is the ratio of the luminous energy absorbed by the vapour to the luminous energy supplied thereto.

In the case of real alkali elements, one obtains analogous results which can be expressed by the formula:

$$\alpha = nAf(\theta)$$

This qualitative formula remains valid if the alkali vapour is associated with a buffer gas in the absorption vessel.

For measuring the optical absorption power of the vapour, the luminous intensity $I_i$ of the incident light is kept constant and then the intensity of the light transmitted by the vapour, i.e., $I_t$, is measured by photoelectric means. This yields the absorption power $\alpha$ according to the formula $$\alpha = \frac{I_i - I_t}{I_i}$$

In order to determine the angle $\theta$ which modulates the absorption power $\alpha$, the following equation must be solved:

$$f(\theta) = \frac{I_i - I_t}{nAI_i}$$

This is effected according to FIG 1 by appying between the respective inputs of a differential indicator the voltages $I'_i$ and $I_t$. The indicator scale is directly calibrated in angular values. It is obvious that it is possible to use several devices according to FIG. 1, having their optical axes differently oriented so as to produce more comprehensive indications about the orientation of $$\vec{H_r}$$

in space.

The magnetic compass according to FIG. 1 is constructed for measuring the angle $\theta$ which the magnetic field forms with the axis $o-z$. This angular measurement does not correspond to a directional measurement since the plane containing $o-z$ and $$\vec{H_r}$$

is not horizontal; moreover, the indication supplied by the device 7 is read off a nonlinear scale since the absorbed intensity $I_i - I_t$ is not proportional to the angle $\theta$. Another drawback is that the same reading will be obtained for two values of $\theta$ differing from each other by 180°; therefore, the useful range of the instrument must be restricted to values of $\theta$ lying between 0 and 90°.

FIG. 4 shows a magnetic compass devised for the accurate determination of a direction and which is free of the above drawbacks. It comprises, arranged along a vertical optical axis $o-z$, the elements 1, 2, 3, 4 and 5 of FIG. 1, and in addition thereto, the indicators 17 and 18, whose respective axes $o-y$ and $o-x$ form with $o-z$ a trirectangular trihedron. A local oscillator 21 supplies at the frequency F a frequency divider 20 with a dividing ratio of $1/N$; this divider is connected to an amplifier 19, having two outputs connected respectively to inductors 17 and 18 through which flow currents at the frequency $F/N$ with equal intensities and which are phase shifted with respect to each other by 90°. The oscillator 21 also supplies a digital counter 24 with a counting input M and a zero reset input A. One of the outputs of the amplifier 19 is connected to the input M of the counter 24 via a pulse generator 25, the pulses $t_1$ of which are produced at a predetermined point of the variation cycle of the current flowing throught the indicator 18. The photoelectric element 5 is coupled to the input A of the counter 24 through a pulse generator 23 preceded by an amplifier 22. The generator 23 generates pulses $t_2$ which coincide with the minima of the light intensity received by the element 5. The terrestrial magnetic field $$\vec{H_0}$$

forms with $\vec{o-z}$ an angle $i$ and is located in the plane $\pi$ passing through $o-z$, forming with $o-x$ an angle $\delta$ which represents the direction to be measured. This field $$\vec{H_0}$$

is combined vectorially with the rotating field $$\vec{H}$$

produced by the inductors 17 and 18 so as to subject the vapour to a resulting field $$\vec{H_r}$$

forming with $o-z$ an angle $\beta$ whose value is modulated at the frequency $F/N$. The field $$\vec{H}$$

being located in the plane $x-o-y$ and forming with $o-x$ an angle $$\frac{2\pi F.t}{N}$$

it can easily be demonstrated that the cosine of the angle $\beta$ passes through its minimum value, of the following term is fulfilled:

$$\frac{2\pi Ft}{N} = \delta = 2k\pi$$

where $k$ is a whole number.

The same also applies to the light intensity received by the element 5. The generator 25 emits a pulse $t_1$ at the instants 0, $N/f$, $2N/F$ . . . $kN/F$, and the generator 23 generates a pulse $t_2$ each time the light intensity received by the element 5 is at minimum, and it may be seen that the time interval between the pulses, $t_1$ and $t_2$ following each other can be expressed by the term:

$$\Delta t = \frac{N}{2\pi F} \cdot \delta$$

Since the counter 24 counts the frequency F during this interval of time $\Delta t$, it indicates $$\frac{N}{2\pi} \cdot \delta$$

which is the measurement of the direction in *n*ths of a revolution.

The magnetic compases described with reference to FIGS. 1 to 4 are characterized by a high degree of accuracy since experiments have shown that it is possible to indicate a change in the orientation of the magnetic field of the order of one thousandth of a degree. A transverse magnetic disturbance of the order of one gamma ($10^{-5}$ oersted) in the terrestrial magnetic field can be detected. Regarding the determination of direction, and adopting as measuring frequency one measurement per second, it is necessary, for obtaining a precision of one thousandth of a degree, to use a frequency F of the oscillator 21 at least equal to 360 kc./s.

What is claimed is:

1. An optical pumping goniometer system for sensing the angle of deviation of an external magnetic field with respect to an axis, said system comprising: a monochromatic source of light positioned by supplying along said axis a parallel beam of circularly polarized light; an absorption cell filled with an alkali vapour, positioned in the path of said beam and subjected to said field; a photoelectric transducer intercepting the portion of said beam emerging from said cell for delivering a voltage, and indicator means receiving said voltage from said photoelectric transducer for supplying an angle reading whose value is determined by said voltage; said source including: a bulb filled with said alkali vapour; means for supplying energy to said bulb, means coupled to said energy supplying means for controlling the intensity of the luminous energy radiated by said source, and means for circularly polarizing said radiated luminous energy; said controlling means including a further photoelectric transducer intercepting a portion of said radiated luminous energy; said indicator means comprising: subtracting means having a first input coupled to said transducer, a second input coupled to said further transducer and an output for delivering said angle reading.

2. An optical pumping goniometer system for sensing the angle of deviation of an external magnetic field with respect to an axis, said system comprising: a monochromatic source of light positioned for supplying along said axis a parallel beam of circularly polarized light; an absorption cell filled with an alkali vapour, positioned in the path of said beam and subjected to said field; a photoelectric transducer intercepting the portion of said beam emerging from said cell for delivering a voltage, and indicator means receiving said voltage from said photoelectric transducer for supplying an angle reading whose value is determined by said voltage; said source including: a bulb filled with said alkali vapour, means for supplying energy to said bulb, means coupled to said energy supplying means for controlling the intensity of the luminous energy radiated by said source, and means for circularly polarizing said radiated luminous energy; inductor means for superimposing on said external field a magnetic field having a predetermined intensity and rotating with a predetermined angular velocity in a plane perpendicular to said axis; generator means having at least one output feeding said inductor means; first pulse generator means coupled to said output for generating a pulse each time the rotating field coincide with a predetermined direction contained within said plane; second pulse generator means coupled to said photoelectric means for generating a pulse each time said voltage is a minimum; and means for measuring the time delay between the pulses respectively supplied by said first and second pulse generator means.

3. A goniometer system as claimed in claim 2, wherein said inductor means comprise first and second coils whose respective axis form with said axis a rectangular trihedron; said generator means comprising: a master oscillator, a frequency divider controlled by said oscillator, an amplifier having an input coupled to said frequency divider and two outputs; said two outputs being respectively coupled to said first and second coils and respectively supplying alternating currents in phase quadrature; said time delay measuring means comprising a counter having a counting input coupled to said master oscillator for receiving a train of pulses, an input for starting the counting upon reception of a starting pulse from said first pulse generator means and an input for transferring the count and resetting the counter to zero each time a resetting pulse is supplied by said second pulse generator means, whereby said counter indicates a measure of the time interval between said starting and resetting pulses corresponding to the angle formed by said predetermined direction and the projection of said external field on said plane.

References Cited

UNITED STATES PATENTS

| 3,114,103 | 12/1963 | Serson | 324—0.5 |
| 3,187,251 | 6/1965 | Bell | 324—0.5 |
| 3,191,118 | 6/1965 | Jung | 324—0.5 |
| 3,256,500 | 6/1966 | Arnold | 324—0.5 |
| 3,284,699 | 11/1966 | Malnar | 324—0.5 |

OTHER REFERENCES

De Bolt: Magnetometer System for Orientation in Space Electronics, Apr. 8, 1960, pp. 55–58.

RUDOLPH V. ROLINEC, Primary Examiner

M. J. LYNCH, Assistant Examiner